Nov. 15, 1938.  G. L. MOORE  2,136,822
PISTON
Filed May 8, 1936  4 Sheets-Sheet 1
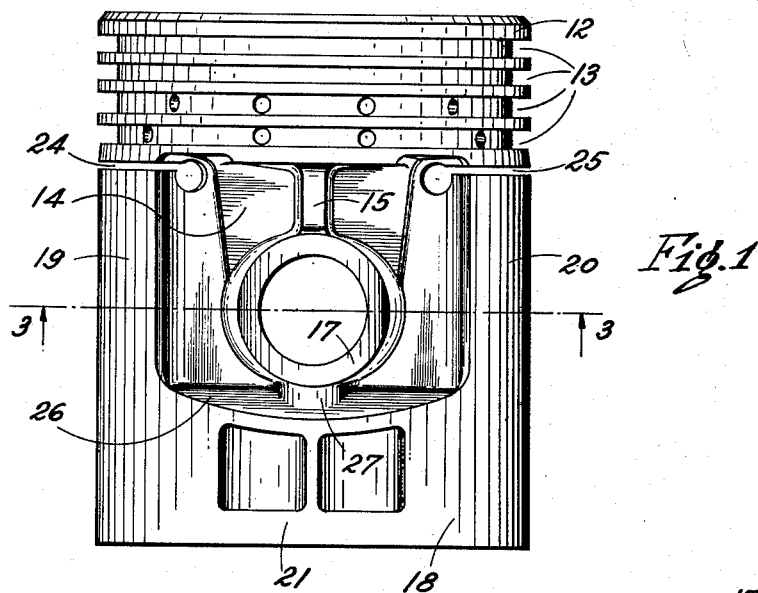
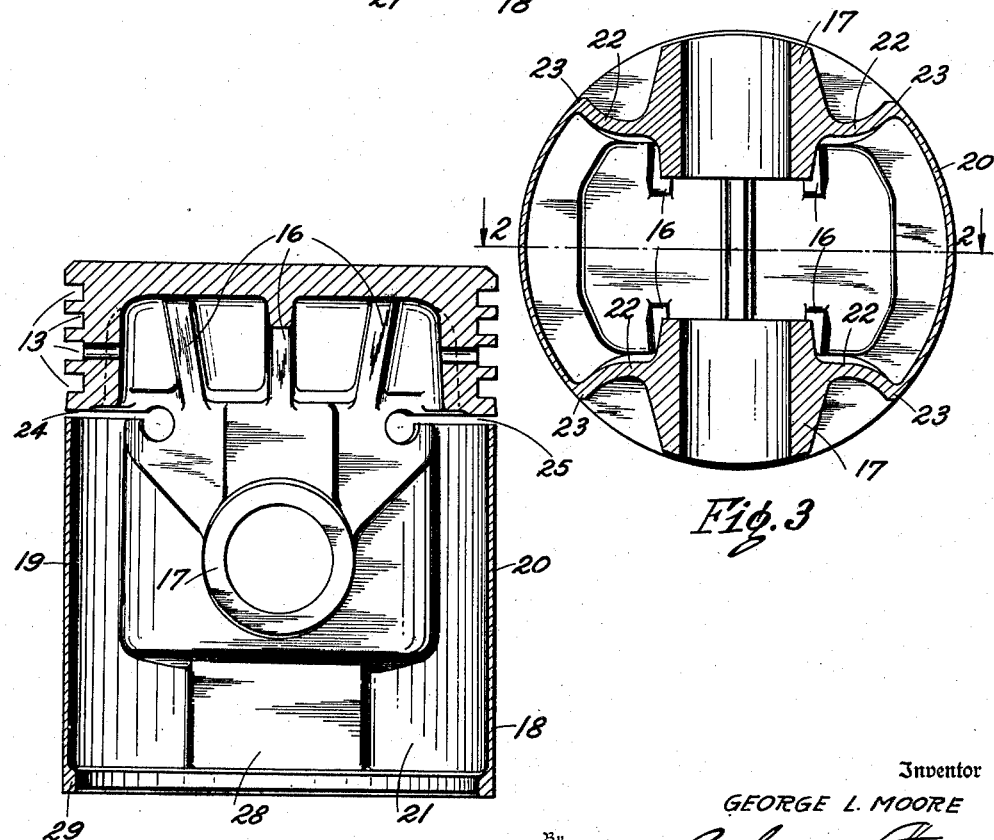
Fig. 1
Fig. 2
Fig. 3
Inventor
GEORGE L. MOORE
By Richey & Watts
Attorneys Nov. 15, 1938.   G. L. MOORE   2,136,822
PISTON
Filed May 8, 1936   4 Sheets-Sheet 2

Inventor
GEORGE L. MOORE
By Richey & Watts
Attorneys

Nov. 15, 1938.  G. L. MOORE  2,136,822
PISTON
Filed May 8, 1936  4 Sheets-Sheet 3

Inventor
GEORGE L. MOORE

Patented Nov. 15, 1938

2,136,822

UNITED STATES PATENT OFFICE 2,136,822

PISTON

George L. Moore, Cleveland, Ohio, assignor to Aluminum Company of America, Pittsburgh, Pa., a corporation of Pennsylvania Application May 8, 1936, Serial No. 78,609

9 Claims. (Cl. 309—10)

This invention relates to internal combustion engine pistons and particularly to pistons made of light metal alloy for operation in cast iron engine cylinders or the like. Pistons made of light metal alloy such as aluminum alloy for operation in cast iron internal combustion engine cylinders have many recognized advantages flowing primarily from the low weight and high heat conductivity of the light metal alloy. The conventional internal combustion engine piston is provided with a head which carries expansible packing rings and a skirt provided with bearing surfaces engaging the cylinder walls to guide the piston and wrist pin bosses for receiving a wrist pin to pivotally connect the piston to a connecting rod or pitman, the other end of which is journalled upon the crankshaft. The skirts of such pistons must, therefore, guide the piston within the cylinder and transmit to the cylinder wall the lateral components of the forces transmitted between the piston and the crankshaft result from the angularity of the connecting rod. resulting from the angularity of the connecting rod.

The successful use of light metal alloy pistons in engines operating through a wide range of loads and temperatures, such as automobile engines, has necessitated the use of some means to absorb or compensate for the excess thermal expansion of the piston with respect to the cylinder in order to avoid slapping and oil pumping at low temperatures and seizing or scoring at high temperatures.

Among the widely used light metal alloy pistons are the conventional split skirt piston, and the T-slot piston such as illustrated in my prior Patent No. 1,927,611. In the split skirt piston the skirt is made yieldable by means of one or more slots extending through the height of the piston, and in the T-slot piston the skirt is made yieldable by the combination of a special slotting arrangement and an oval contour.

In all yieldable skirt pistons the skirt yields or flexes at high temperatures to prevent the piston binding within the cylinder so that it may be fit when cold with a closer clearance than would otherwise be possible. However, the skirt also flexes to some extent under each lateral thrust to which the skirt is subjected during operation. It will be understood that there are normally six reversals of thrust during each complete cycle or two revolutions of the crankshaft in a conventional Otto cycle engine, one reversal occurring at each end of each stroke of the piston and one occurring at the point where acceleration changes to deceleration in each of the intake and exhaust strokes. The thrust which occurs at the beginning of the power stroke is produced by the lateral component of the force delivered to the piston head by the explosion in the cylinder. The other reversals referred to are produced by inertia of the piston. In high speed engines these inertia thrusts become substantial and result in considerable and rapidly repeated flexing of the skirt of a yieldable piston. These rapidly repeated thrusts and consequent flexing of the parts of a piston skirt tend to give rise to fatigue failure of the metal and likewise have a tendency to tilt or cock the piston within the cylinder which results in excessive oil consumption.

I have discovered that by making the skirt of a piston thinner than has been heretofore considered possible or practical and taking advantage of certain natural laws I can greatly reduce the tendency toward fatigue failure of the metal of an internal combustion engine piston and likewise reduce the tendency to cocking in the cylinder so that I may construct a light metal alloy internal combustion engine piston which may be fit with an extremely close clearance when cold to avoid all slapping, which will yield to prevent binding and give a full engagement at high temperatures, and which will properly transmit the lateral thrust loads at all temperatures without danger of fatiguing the metal and without injurious tilting or cocking in the cylinder.

A piston constructed according to my invention embodies a skirt wall of such thinness and flexibility that the stresses set up by the amount of bending or flexing which must be permitted to compensate for the excess expansion of the metal of the piston and consequently the tendency toward permanent deformation or fatigue of the metal are reduced to such a point as to substantially eliminate collapse or fatigue failure of the piston even in extremely high speed operation while the amount of deflection under any loads encountered in service is definitely limited. A preferred embodiment of my invention consists of a piston having a skirt finished to an oval contour with its major axis perpendicular to the wrist pin axis and with the thrust faces separated at their upper edges from the head and constructed of such a thin section that the lateral thrust loads to which the piston is subjected when cold will cause the thrust faces to yield into full engagement with the cylinder wall without setting up excessive bending stresses in the metal of the skirt so that the thrust loads are transmitted to the cylinder wall by a restrained sheet action of the thrust faces.

Many advantages of my invention will be apparent from the following detailed description of preferred embodiment thereof.

In the accompanying drawings:

Figure 1 is a side elevation of a preferred form of piston embodying my invention;

Figure 2 is a longitudinal section of the same taken substantially on the plane indicated by the line 2—2 of Figure 3;

Figure 3 is a horizontal section taken on the line 3—3 of Figure 1;

Figure 4:
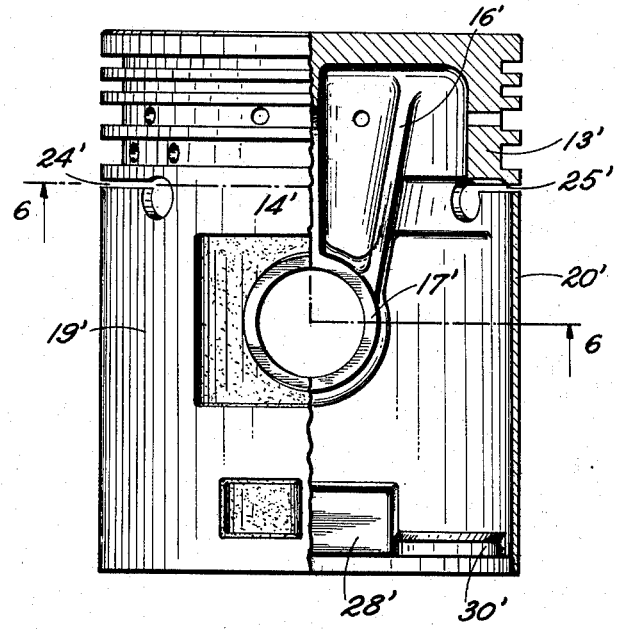
Figure 4 is a view partly in side elevation and partly in vertical section of a modified form of piston embodying my invention.

Referring to the drawings the preferred form of piston embodying the present invention is shown in Figures 1 to 3. The piston includes a head 12 having a depending ring flange grooved on the outside as indicated at 13 to receive the usual piston packing rings. Boss carrying walls indicated at 14 are integral with the lower edge of the ring flange on opposite sides of the piston and are rigidly re-enforced by webs 15 and 16. Wrist pin bosses 17 are formed in the walls 14 provided with axially aligned openings to receive a wrist pin by which the piston is connected to a connecting rod or pitman.

A skirt indicated generally at 18 is provided with opposed thrust faces 19 and 20 which are connected together below the wrist pin bosses by extensions or bands 21 forming a circumferentially continuous lower portion. Laterally extending supporting webs 22 are integral with the opposite sides of each of the boss carrying walls 14 and serve to support the thrust faces. Preferably these webs diverge outwardly from the wrist pin bosses to their points of connection 23 with the lateral edges of the thrust faces 19 and 20 as illustrated in Figure 3. This arrangement permits the inner ends of the webs 22 to be supported by the boss carrying walls closely adjacent the center of support of the piston upon the wrist pin and yet permits the thrust faces to be made of any desired circumferential extent which may be about 90° as shown in the drawings. The outward flaring of the webs 22 also facilitates the movement of the connections 23 which occur during the operation of the piston with a minimum of stress upon the boss carrying walls 14 and the piston head 12.

The upper edges of the thrust faces 19 and 20 are separated from the ring flange of the head by horizontal slots 24 and 25 respectively which extend the full circumferential extent of the thrust faces and terminate in the webs 22. A shelf-like web 26 may be provided integral with the lower edges of the webs 22 on each side of the piston and extending out and integral with the lower connecting portion 21 of the piston skirt so as to close both sides of the piston and prevent oil from splashing outwardly between the thrust faces 19 and 20. A re-enforcement 27 is preferably provided extending downwardly from each wrist pin boss 17 so as to make the skirt more rigid below the wrist pin bosses. Suitable balancing bosses 28 are also preferably formed on the inner side of the skirt below the wrist pin bosses so that any necessary amount of metal can be cut away to exactly balance the weight of a plurality of pistons. A re-enforcing flange 29 is formed adjacent the open end of the piston skirt and in the embodiment shown in Figures 1 to 3 is annular in form.

The piston is formed by casting in a permanent mold in the usual manner and is finished by cutting the slots 24 and 25, the ring grooves 13, and machining and grinding the exterior surface of the piston. The skirt itself including the entire extent of the thrust faces 19 and 20 is made much thinner than has heretofore been considered necessary to resist the loads to which the skirt is subjected in service. In practice I make the skirt walls at the top with a thickness of from a little less than $\frac{1}{16}$ of an inch to about $\frac{3}{32}$ of an inch. For most sizes of pistons within the range of size used in most automobile engines I prefer to make the skirt about $\frac{5}{64}$ of an inch thick at the top. The inside of the skirt walls of the piston are preferably tapered to a slightly larger diameter at the open end of the piston to facilitate removal of the cores in casting. This taper is ordinarily about ½° so that the skirt is slightly thinner at the bottom than at the top.

Since it is not practicable by the present commercial practice to cast a skirt of light metal alloy with as thin a section as is required for the present invention, I prefer to add sufficient thickness to the exterior surface of the skirt to give good casting results and then machine off this metal in finishing the piston to reduce the skirt in thickness to the section required by the present invention.

In finishing, the exterior of the skirt is ground to an oval contour with its major axis perpendicular to the axis of the wrist pin bosses. The piston is fit to an internal combustion engine cylinder with a close clearance at the centers of the thrust faces. By reason of the improved operation of the present piston I have found that these pistons may be fit with a clearance of from about .00075 of an inch to about .0015 of an inch on the diameter; or in other words with about one-half of these amounts of clearances between the center of each thrust face and the cylinder wall.

The skirt is provided with sufficient clearance on each side of the centers of the thrust faces by the oval grinding to absorb the excess thermal expansion of the piston skirt at full operating temperature so that both trust faces will bear for substantially their full extent without excessive friction upon the cylinder wall when the piston reaches full operating temperature. The expansion characteristics of the piston and temperature to which it is subjected in operation determine the degree of ovality to be given to the skirt, or in other words, the amount of clearance provided by the oval contour at the corners or shoulders of the thrust faces.

At full operating temperature it will be apparent that both thrust faces 19 and 20 will nicely fit the cylinder wall for substantially their full circumferential and vertical extent and therefore the bearing pressures will be uniformly distributed through the maximum bearing area.

The operation of the piston when cold and also the ability of the piston to fit the cylinder wall regardless of its shape at all temperatures can best be explained by reference to the diagrams, Figures 7 to 11, inclusive.

Figure 7:
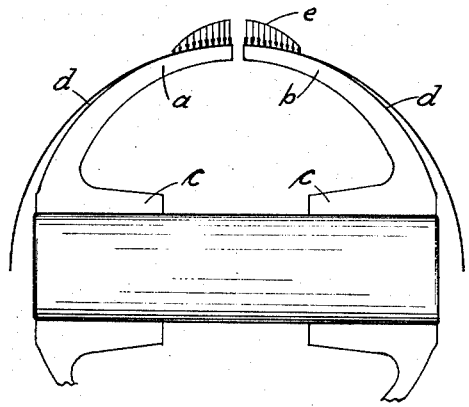
Figure 7 is a diagrammatic sectional view of a prior art type of piston.

Figure 7 is a diagrammatic sectional view of a conventional type piston in a cylinder. It will be seen that the skirt portions $a$ and $b$ must transmit the lateral loads from the wrist pin boss $c$ to the cylinder wall by a cantilever beam action. That is to say the adjacent tips of the sections $a$ and $b$ first contact the cylinder wall and further contact occurs as the tips are bent inwardly. The skirt is constructed with sufficient thickness so that the parts corresponding to the corners or shoulders of the thrust faces at the points indicated at $d$ never come into contact with the cylinder wall from the lateral thrusts. As a consequence the thrust transmitted to the cylinder wall from the wrist pin bosses $c$ is distributed as shown by the small arrows $e$, the lengths of the arrows indicating the relative magnitude of the pressures exerted at the different points.

Figure 11:
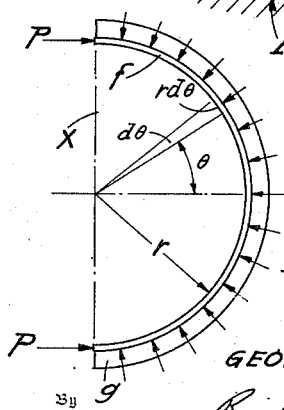
Figure 11 is a diagram illustrating a principle of operation involved in the present invention.

If it be assumed that a semi-cylindrical sheet with no resistance to bending be placed in a semi-cylindrical restraining wall as indicated by the sheet $f$ in the restraining wall $g$ in Figure 11, and pressure be applied to the ends of the sheet, as indicated by the arrows P, the load would be transmitted to the restraining wall solely by compression in the sheet and the sheet would exert a uniform radial force against the wall area of the sheet.

This is shown by Figure 11. P represents the pressure applied to each end of the sheet $f$. Let R equal the radial pressure per unit area of the sheet $f$ on the wall $g$. The bearing pressure exerted by the differential area one unit in length and $rd\theta$ in width is $Rrd\theta$. The component of this pressure perpendicular to the axis $x$, which will be called the lateral component, is $Rr \cos \theta d\theta$. The total lateral bearing reaction to the left is the sum of these lateral components for all of the differential areas throughout 180° extent of the sheet, and may be expressed $$\int_{-\frac{\pi}{2}}^{\frac{\pi}{2}} Rr \cos \theta d\theta$$

This reaction is balanced by the total pressure to the right in Figure 11, 2P, so that the above integral is equal to 2P.

$$Rr \int_{-\frac{\pi}{2}}^{\frac{\pi}{2}} \cos \theta d\theta = 2P$$

solving $$Rr \sin \theta \Big]_{-\frac{\pi}{2}}^{\frac{\pi}{2}} = 2P$$

$Rr[\sin 90° - \sin 270°] = 2P$ or $Rr[1-(-1)] = 2P$ or $2Rr = 2P$ $$R = \frac{P}{r}$$

So that in the theoretical example, the radial bearing pressure per unit area at any point on the surface is equal to the load applied at each extremity of the section. Since in the example the axial length of the semi-cylindrical sheet $f$ was assumed to be unity, if $l$ represents this axial length and F, the total thrust force applied to the sheet $$P = \frac{F}{2l} \text{ and } R = \frac{F}{2rl}$$

Therefore the radial bearing pressure at any point on the surface is equal to the total thrust force divided by twice the product of the length and radius of the thrust face.

Since the bearing area of the sheet $f$ is equal to the radius times the axial length times Pi the total bearing pressure exerted by the sheet $f$ upon the restraining wall $g$ is equal to the total thrust force times ½Pi. The stress in the sheet $f$ is pure compression since the sheet has no resistance to bending whereas in a beam the stress on one side of the neutral axis is compression and on the other side tension. In a restrained sheet the tension stresses are taken in the restraining wall $g$ and are transmitted to that wall by the components of the radial pressure of the sheet which are perpendicular to the line of action of the forces. As a consequence the total bearing pressure of the sheet $f$ upon the restraining wall $g$ is greater than the total thrust force 2P applied to the ends of the sheet.

If the ratio of the total thrust force to the total bearing pressure is taken as the efficiency of the arrangement in transmitting the lateral thrust to the restraining wall it will be seen that the efficiency with a sheet 180° in extent is 63.6. Since it is necessary in a piston construction to provide some clearance in the region of the wrist pin bosses to absorb the excess thermal expansion and since it is also desirable to increase the efficiency so as to reduce the friction, it is found that if the restrained sheet be made about 90° in extent instead of 180° a much greater efficiency is obtained. For example, if the summation of the lateral components represented by the definite integral given above be taken through a circumferential extent of 90°, or in other words from a value of $\theta$ from $$\frac{Pi}{4} \text{ to } -\frac{Pi}{4}$$

the resulting equation is $$2P = \sqrt{2} Rrl = F$$

In other words the radial bearing pressure per unit area of a sheet 90° in circumferential extent is equal to the total thrust force divided by the product of the length and radius of the sheet times the square root of 2. As a consequence the efficiency of a thrust face 90° in circumferential extent is 90% as compared with the efficiency of 63.6% of the thrust face 180° in circumferential extent.

In the reduction of the circumferential extent of the sheet from 180° to 90° the excess of the total bearing pressure over the total thrust force decreases rapidly while the unit bearing pressure increases relatively slowly. As will be seen from the above the unit bearing pressure of the sheet 90° in circumferential extent is equal to the $$\sqrt{2}$$

or 1.4142, times the unit bearing pressure of the sheet 180° in extent. To decrease the circumferential extent of the sheet to much less than 90° is undesirable, since if the circumferential extent of the sheet is greatly decreased the unit bearing force is excessively increased.

Figure 8:
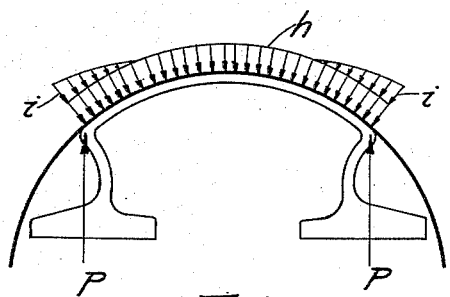
Figure 8 is a diagrammatic sectional view illustrating the operation of the present invention.

Accordingly if the theoretical restrained sheet with no resistance to bending is made of substantially 90° in circumferential extent as illustrated in the diagram, Figure 8, the force distribution will be substantially as indicated by the arrows $h$ and $i$, the arrow $h$ representing the uniform radial bearing pressure produced by the restrained sheet action, and the arrows $i$ representing the excess force at the ends of the sheet resulting from its reduction in circumferential extent. This increase in force represented by the arrows $i$ arises from the fact that only the tangential components of the forces P, P, is available to produce the restrained sheet action and the radial component of these forces is added to the pressures at the corners in the manner indicated by the arrows $i$.

Figure 9:
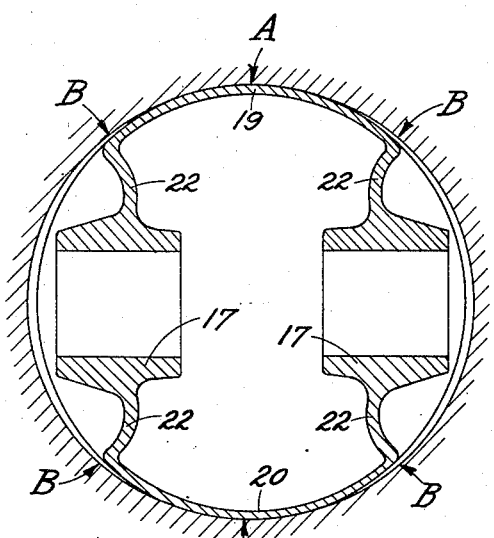
Figure 9 is a diagrammatic sectional view showing the relationship of a piston constructed in accordance with the present invention to the cylinder wall.

A piston constructed in accordance with the present invention utilizing the restrained sheet action explained above is illustrated diagrammatically in Figures 9 and 10. The thrust faces 19 and 20 are made oval in contour and are supported by the webs 22 from the wrist pin bosses 17. The relation of the piston to the cylinder when cold and before the application of any lateral thrust is illustrated in Figure 9. The centers of the thrust faces at the points A are fit relatively close to the cylinder wall. The clearance provided by the oval contour at the corners or shoulders of the thrust faces at the points B is sufficiently large to permit the expansion of the piston at full operating temperature without binding in the cylinder.

Figure 10:
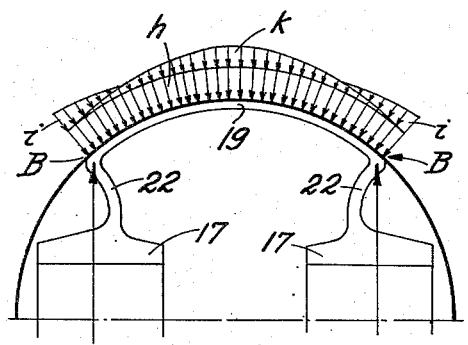
Figure 10 is a diagrammatic view illustrating the operation of the present invention.

Upon the application of a lateral thrust load toward the thrust face 19 this face bends into conformity with the cylinder wall as indicated in Figure 10. The wall of the thrust face is provided with a certain resistance to bending and therefore a portion of the lateral thrust load is resisted by the beam action of the thrust face until the corners or shoulders of the thrust face at the points B come into contact with the cylinder wall. This portion of the thrust load which is taken by a beam action in the thrust face 19 results in a distribution of pressure between the thrust face 19 and the cylinder wall as indicated by the arrows $k$ in Figure 10. The remainder of the thrust load then produces the restrained sheet action described above setting up bearing pressures of the thrust face 19 against the cylinder wall as indicated by the arrows $h$ and $i$ explained in connection with Figure 8. The excess bearing pressure added to the uniform bearing pressure represented by the arrows $h$ and resulting from the beam action of the thrust face is concentrated at the center of the thrust face and decreases to zero at the corners as indicated by the relative lengths of the arrows $k$. The thickness and resistance to bending of the walls of the thrust faces are made such that the concentration of a part of the bearing pressures toward the center by the beam action substantially equalizes the concentration of the added bearing pressures at the corners of the thrust faces resulting from the radial components of the thrust faces at those points. The net result is a substantially uniform distribution of the thrust load throughout the complete area of the thrust face.

Preferably the major portion of the thrust loads are transmitted to the cylinder wall by the restrained sheet action. It will be understood that the pressures concentrated at the corners or shoulders of the thrust faces at the points B decrease with an increase in circumferential extent of the thrust face and similarly that the pressures concentrated toward the center vary with the resistance to bending of the thrust face. Accordingly, the circumferential extent of the thrust face; the resistance to bending of the section; and the contour of the oval grinding, may be proportioned to produce any desired distribution of the bearing pressures added to the uniform pressures produced by the restrained sheet action.

It will be understood that when the piston is cold and arranged in the cylinder as illustrated in Figure 9 all thrust forces of any substantial magnitude will flex the thrust face subjected to the force into full engagement with the cylinder wall, or in other words will flex the thrust face through a distance which will bring it into contact with the cylinder wall at the points B. During this flexing the thrust face acts as a beam and when it reaches conformity with the cylinder wall the remainder of the thrust load is transmitted by restrained sheet action in which the metal of the thrust face is subjected solely to compression stresses.

The amount which each thrust face can flex with a beam action under any thrust load is definitely limited by the contour of the skirt, since the flexing is stopped when the skirt contacts the cylinder wall at the points B. The distance through which the metal of the skirt is flexed or bent on each thrust is therefore about the same as the distance through which the prior types of piston skirts are bent by normal thrust loads and less than the distance through which such prior types of piston skirts are bent by abnormal thrust loads. The stress to which the metal is subjected during such flexing in the present invention, however, is much less than the stress to which the metal is subjected in the prior types of piston skirt in which the loads are taken by beam action. The load required to flex a beam of a given depth through a given deflection within the elastic limit of the material is many times greater than the load required to flex a beam of half that depth through the same deflection. Correspondingly, the stresses set up in the metal in the thinner beam are considerably less than the stresses set up in the metal of the thicker beam. In one embodiment of my invention which I have found to be quite satisfactory, the thickness of the skirt wall is reduced to such an extent that the skirt is about five times as flexible as the thinnest skirt walls heretofore incorporated in the average size automobile engine pistons. With a lateral thrust load of 500 lbs. which is about the maximum thrust load encountered in an average size automobile engine it will be apparent that the piston can be arranged to deflect the same amount as would be produced in the prior types of pistons by the full load under one-fifth of the full load and then transmit the remaining four-fifths of the load to the cylinder wall by restrained sheet action. As a consequence the stresses set up in the metal of the skirt wall by the thrust load would be only one-fifth as great as in the prior type of skirt and therefore the tendency toward fatigue of the metal under repeated flexing is tremendously reduced.

Likewise in the prior types of skirt, such for example as illustrated diagrammatically in Figure 7, the distance through which the skirt deflects under a given load is determined by the resistance to bending so that the deflection is resiliently stopped under any particular load. As a result the piston is held in axial alignment with the cylinder only by the resilience of the metal of the skirt so that in effect the piston is guided by a spring action. As a consequence cocking or tilting of the piston a slight amount is readily permitted by the skirt wall. According to the present invention the deflection of the skirt wall under the lateral thrusts is stopped definitely by the thrust face coming into full conformity to the cylinder so that the piston is positively held in axial alignment with the cylinder and it cannot tilt or cock by spring of the top and bottom parts of the thrust face which is under load. As a consequence the piston made according to the present invention gives much better oil control at all temperatures than any prior type of yieldable skirt piston.

During the bending of the thrust faces 19 or 20 of a piston constructed in accordance with the present invention in conformity with the cylinder wall it will be apparent that the outer ends of the webs 22 must move apart a very slight amount to permit the bending of the thrust face. The bending resistance of these webs through the deflection required is therefore added to the bending resistance of the thrust face of the skirt in reaching conformity with the cylinder wall, but since the required amount of movement is extremely slight these webs may be made of a relatively heavy section as illustrated without appreciably adding to the bending resistance of the thrust faces as a whole. In the preferred construction as illustrated in Figures 1 to 3 inclusive the webs 22 are flared outwardly so that the point of connection of the webs with the wrist pin bosses and the boss carrying walls may be maintained as close together as possible while the circumferential extent of the thrust faces may be 90° or more as desired.

When the piston reaches full operating temperature it theoretically expands into a close clearance relation with the cylinder wall throughout its circumference. However, any deviation of the cylinder wall from a true circular cross sectional contour are followed by corresponding deviations of the thin thrust faces which are bent into full conformity with the cylinder wall under each lateral thrust of any magnitude so that the bearing pressure is uniformly distributed throughout the extent of the thrust face as illustrated diagrammatically in Figure 10 regardless of the temperature of the parts or the exact contour of the cylinder wall. Likewise deviations of the contour of the piston skirt from the desired contour which are necessitated by the usual manufacturing tolerances are accommodated by the flexibility of the skirt so that uniform distribution of the bearing pressures is obtained at all times.

Figure 12:
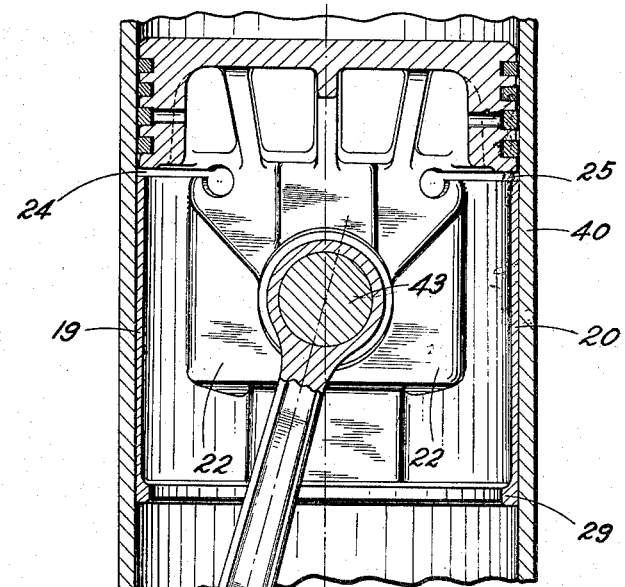
Figure 12 is a sectional elevation of the piston of the present invention as arranged in an internal combustion engine.
Figure 12:
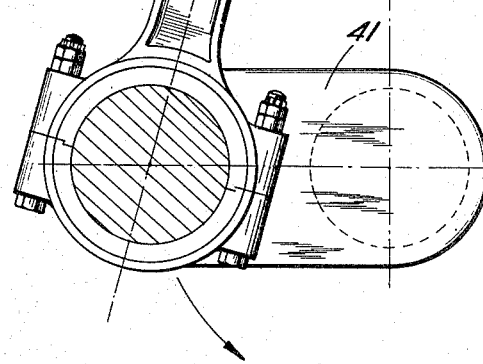

To illustrate the novel function which the engine cylinder performs in connection with the piston constructed according to my invention I have shown in Figure 12 a piston as above described arranged in the cast iron cylinder of a conventional combustion engine. The piston made of aluminum alloy or other light metal is arranged to reciprocate in a cast iron cylinder 40 and is connected to the crankshaft 41 of the engine through a connecting rod 42 and wrist pin 43. Referring back to the operation of the piston as described in connection with Figures 8 to 11 inclusive the thrust loads are transmitted from the thrust faces 19 and 20 to the wrist pin 43 through the webs 22 attached to the pin bosses and the flexure of the thrust faces 19 and 20 under the thrust load brings the thrust faces into full conformance with the cylinder wall (Figure 10). In the prior art thick section thrust face (Figure 7) the beam action following the application of thrust load placed the inner fibers of the thrust wall in tension and the outer fibers of the thrust wall in compression. According to my invention, however, following the slight tensional stress placed on the inner fibers of the thin section by the initial deflection, the thrust face at points B—B contact the cylinder walls and thereafter the cast iron cylinder restricts further movement of points B—B away from each other and therefore prevents the establishment of any additional tensioning stress in the inner fibers. In other words, the cylinder wall may be considered as a sort of C-clamp which assumes the tension load in the thrust face which would result across the chord B—B as a result of the imposed thrust load. In the beam action type of thrust face such as shown in Figure 7 the inner fibers of the thrust face must assume all of the tension which results from superimposed thrust load and thus the thrust load requires a section having sufficient cross sectional area to take the compression above the neutral axis and the tension below the axis. According to the theory of operation advanced in support of the thrust face as in Figure 10 there is no tension in the thrust face 19 and therefore the cross sectional area may be reduced to provide only sufficient cross sectional area to resist the compression loads. In this manner I have provided a combination of a cast iron cylinder and an aluminum piston wherein certain functions associated with transmitting the thrust load are transferred from the aluminum piston to the cast iron cylinder.

Figure 6:
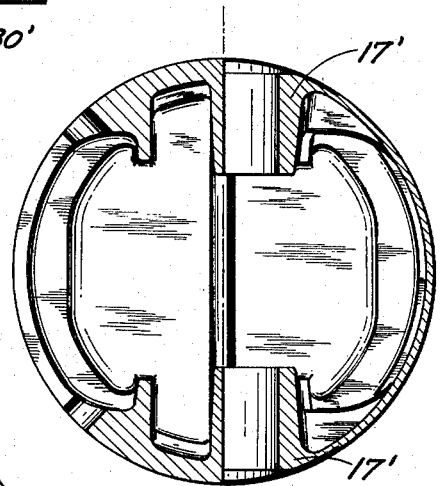
Figure 6 is a sectional view taken on the planes indicated by the line 6—6 of Figure 4.
Figure 5:
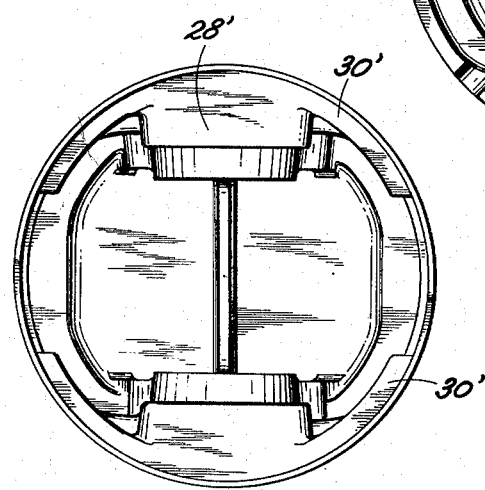
Figure 5 is a plan view of the open end of the piston shown in Figure 4.

A modified form of my invention is illustrated in Figures 4 to 6 inclusive. In this embodiment the boss carrying walls 14' are curved to substantially the same contour as the ring flange 13' with which they are integral and are formed on the inside with suitable re-enforcing ribs 16'. The thrust faces 19' and 20' are continuous in roughly cylindrical form and are integral with the outer ends of the bosses 17'. The horizontal slots 24 and 25 separate the upper edges of the thrust faces 19' and 20' from the piston head in the same manner as in the embodiment illustrated in Figures 1 to 3 inclusive. The lateral edges or corners of the thrust faces 19' and 20' are determined primarily by the ends of the slots 24' and 25'. Since the portions of the skirt walls below the slots 24' and 25' are permitted to flex along elements of the cylindriacl surface of the skirt while the remaining portions of the skirt walls are held against flexing by their attachment to the piston head and also by the rigid boss carrying walls 14' and the re-enforcing ribs 16'. The skirt is provided with an oval contour as in the embodiment previously described and the clearance in the portions of the skirt in the vertical zone of the ends of the slots 24' and 25' is made substantially the same as the clearance at the points B as illustrated in Figure 9. The boss carrying walls between these shoulders or corners of the thrust faces 19' and 20' act substantially in the same manner as the webs 22 so far as supporting the thrust faces is concerned. These portions are arranged to yield outwardly the slight amount required to permit the end edges of the thrust faces to move into full conformity with the cylinder wall as illustrated in the diagram in Figure 10. As in the embodiment illustrated in Figures 1 to 3 inclusive, the skirt is preferably circumferentially continuous below the wrist pin bosses and is provided on the inside with balancing bosses 28' and re-enforcing ribs 30. As shown in Figure 5 the re-enforcing ribs 30 are not completely annular whereas the re-enforcing rib 29 illustrated in Figure 2 is an unbroken annulus. It will be understood that either form of re-enforcing ribbing at the open end of the skirt may be employed. The separated ribs 30 as illustrated in Figure 5 permit the use of a three-part core in molding the piston whereas the completely annular rib 29 necessitates a five-part core.

The purpose of the re-enforcing ribs 29 or 30 at the open end of the skirt in both embodiments illustrated is to stiffen this portion of the skirt to produce substantially the same action at the bottom of the skirt as is obtained at the top. It will be understood that in both embodiments the upper part of the skirt by reason of its connection to the boss carrying walls either directly as illustrated in Figures 4 to 6 inclusive or through the webs 22 as illustrated in Figures 1 to 3 has less flexibility than the open end of the skirt. In order to avoid any cocking and to insure the thrust faces coming into full conformity with the cylinder wall at the same point throughout the height of the skirt, it is desirable to stiffen the open end by means of the ribs 29 or 30 to give to this portion of the skirt the same degree of flexibility or resistance to bending that obtains at the upper part of the skirt.

While I have described preferred embodiments of my invention in some detail it will be understood that I do not wish to be limited except as the invention is defined in the following claims.

I claim:

1. An internal combustion engine piston adapted to reciprocate within an engine cylinder including a head and skirt integrally formed of light metal alloy, said skirt including opposed thrust faces separated at their upper edges from the head and supported at their sides from the head, aligned wrist pin bosses disposed on opposite sides of the piston between said thrust faces, said thrust faces having an oval cross sectional contour with the major axis perpendicular to the axis of said wrist pin bosses, said skirt being of the single walled type through the thrust face area and free interiorly of restraining ties and having such a degree of flexibility as to be flexed into conformity with the engine cylinder wall under lateral thrust and to transmit the major portion of such lateral thrust to the cylinder wall solely by circumferential compression of said thrust faces against the cylinder wall.

2. An internal combustion engine piston composed of a single piece of light metal alloy and including a head, boss carrying walls depending from said head and having aligned wrist pin bosses formed therein and opposed thrust faces carried by said boss carrying walls and separated at their upper edges from said head, said thrust faces throughout substantially their entire area being not more than three-thirty seconds of an inch thick, and having such a degree of flexibility as to be flexed into conformity with the engine cylinder wall under lateral thrust and to transmit the major portion of such lateral thrust to the cylinder wall solely by circumferential compression of said thrust faces against the cylinder wall.

3. An internal combustion engine piston adapted for operation in a cylinder having a circular wall consisting of an integral casting of light metal alloy and including a head, boss carrying walls depending from said head having aligned wrist pin bosses formed therein, a pair of webs extending laterally from said wrist pin bosses at each side thereof, the outer ends of each pair of webs connected to each other by a thin integrally formed thrust face, each of said thrust faces having an oval contour, the major axis thereof being normal to the axis of the wrist pin bosses whereby the ends of the thrust faces and the webs supporting the same are normally spaced from the wall of the cylinder within which the piston operates, said webs being moved away from each other at their thrust face ends in response to thrust loads whereby the thrust face intermediate the webs is reformed and brought into conformance with the circular wall of the cylinder within which the piston operates.

4. An internal combustion engine piston of the type having a single wall thickness in the thrust face area comprising an integrally formed head and skirt, said skirt having aligned wrist pin bosses therein, said skirt and head separated from each other on each side of said wrist pin bosses by horizontal slots to form opposed thrust faces to transmit the thrust loads encountered in operation from the wrist pin bosses to the walls of the cylinder within which the piston operates, said thrust faces initially provided with an oval contour having the major axis normal to the wrist pin boss axis whereby progressively increasing clearances exist from the ends of said major axis toward the wrist pin boss axis, the thickness of at least one of said thrust faces being proportioned with respect to said thrust loads so that the initial application of thrust load flexes said thrust face and brings the same into full conformance with the walls of the cylinder within which the piston operates and the remainder of the thrust load is transmitted by circumferential compression of said thrust face against the cylinder wall.

5. In combination, an engine cylinder circular in cross section, a piston arranged to reciprocate in said cylinder composed of a material having a higher coefficient of expansion than the material of said cylinder, a crankshaft, a connecting rod pivotally connected at one end to said crankshaft and pivotally connected to said piston at the other end by means of a wrist pin, said piston provided with opposed thrust faces having a normally oval cross sectional contour, said thrust faces reduced in thickness so that they will flex under normal thrust loads to reform said thrust faces and bring the same into conformance with the circular cylinder wall whereby the tension resisting function normally imposed upon the inner fibers of a thrst face by a thrust load is transferred to the cylinder wall and the metal of the thrust face is placed in compression.

6. In combination, an engine cylinder circular in cross section, a piston arranged to reciprocate in said cylinder composed of a material having a higher coefficient of expansion than the material of said cylinder, a crankshaft, a connecting rod pivotally connected at one end to said crankshaft and pivotally connected to said piston at the other end by means of a wrist pin, said piston having opposed thrust faces with a normally oval cross sectional contour, said thrust faces throughout substantially their entire area being not more than three-thirty seconds of an inch in thickness whereby the same flex under normal thrust loads into conformity with the circular cylinder wall and transmit such thrust loads in compression, the accompanying tension being imposed upon said cylinder wall.

7. In combination, an engine cylinder circular in cross section, a piston arranged to reciprocate in said cylinder composed of a material having a higher coefficient of expansion than the material of said cylinder, a crankshaft, a connecting rod pivotally connecting said piston to said crankshaft, said piston having opposed thrust faces for transmitting the lateral thrusts of said connecting rod to the cylinder wall, said thrust faces being oval in cross sectional contour with the major axis of the oval in a plane perpendicular to the axis of said crankshaft and said thrust faces being of such thinness and flexibility as to transmit only a part of the normal thrust loads to the cylinder wall by beam action and to transmit the remainder of such thrust loads by restrained sheet action to the cylinder wall.

8. In an internal combustion engine, a cylinder substantially circular in cross-section, a piston reciprocably mounted in the cylinder and including an integral skirt for guiding the piston in the cylinder and transmitting lateral thrust loads thereto, said skirt including opposed arcuate thrust faces oval in cross section with a minimum clearance from the cylinder at their centers and a progressively increasing clearance on each side of their centers when cold and free from lateral thrust loads, each of said thrust faces being flexible in response to a lateral thrust load pressing the same toward the cylinder so that it is flexed into conformity with the cylinder wall and placed in circumferential compression by such a thrust load.

9. In an internal combustion engine, a cylinder substantially circular in cross-section, a piston reciprocable in said cylinder mounted upon a wrist pin, said piston including a skirt having opposed arcuate thrust faces, each of said thrust faces having an oval cross-sectional contour with the major axis of the oval perpendicular to the wrist pin axis, each of said thrust faces being integrally connected to said piston and receiving lateral loads from said wrist pin at arcuately spaced points and being thin and flexible between said points to such a degree as to have insufficient stiffness to resist flexing under the lateral thrust loads, such flexing being limited by the full engagement of the portion between said spaced points with the cylinder wall.

GEORGE L. MOORE.